Patented June 17, 1941

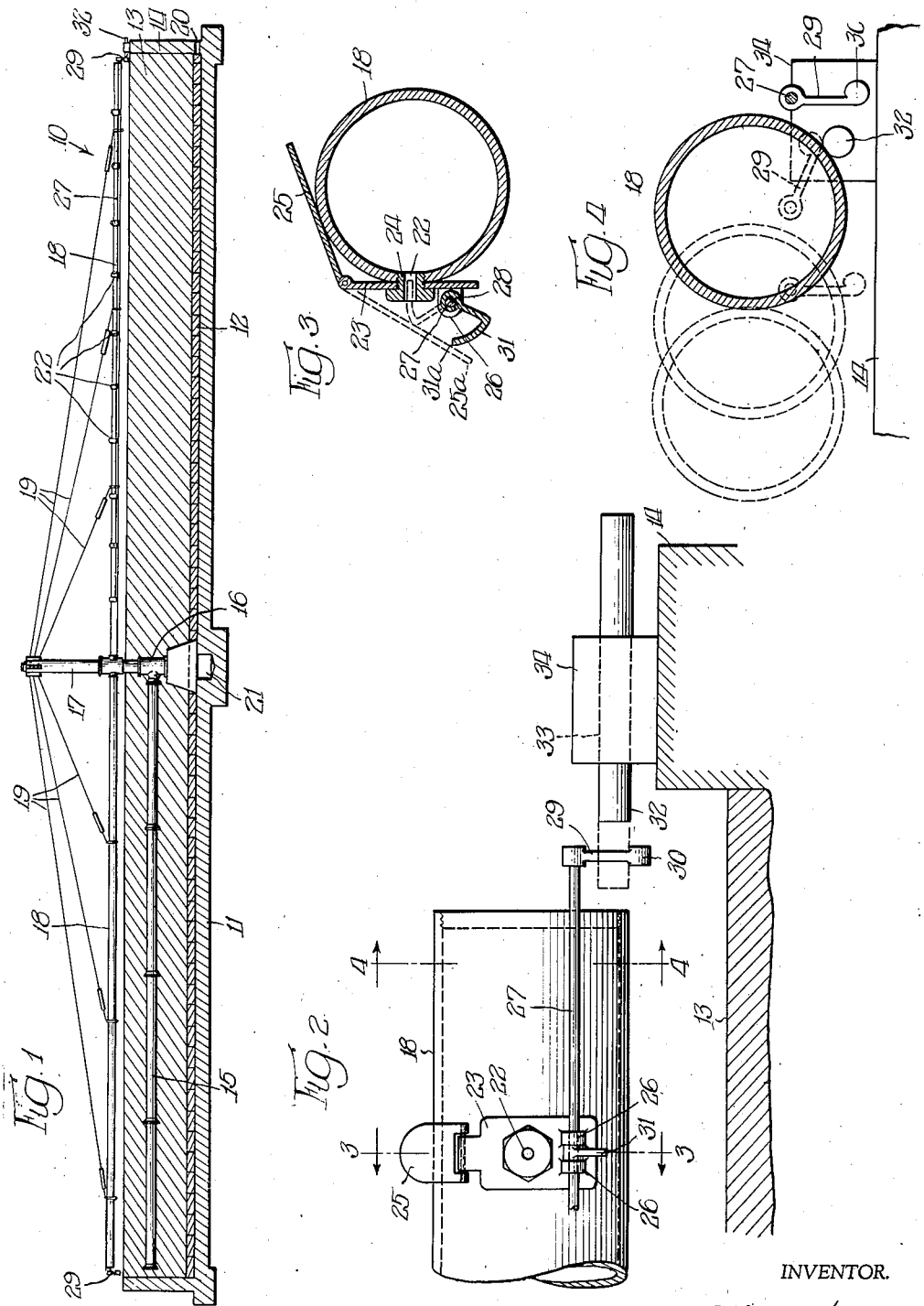

2,245,668

UNITED STATES PATENT OFFICE 2,245,668

LIQUID DISTRIBUTING SYSTEM

Albert B. Hodges, Chicago, Ill., assignor to International Filter Co., Chicago, Ill., a corporation of Delaware Application December 23, 1938, Serial No. 247,351

7 Claims. (Cl. 299—59)

This invention relates to liquid distributing systems with discharge nozzles and in particular to such systems used in biological trickling filters for distributing sewage therein, and is directed to an improvement therein to improve the operation thereof.

Sewage distributors for the purpose indicated are either made in the form of a stationary pipe system equipped with nozzles which are fixed with respect to the filter bed and usually receive sewage under a varying head so that they discharge over a varying area; or they are in the form of a combination of stationary feed inlet and movable distributing part, generally having rotating arms which are equipped with spaced nozzles and are driven by the reaction of the sewage discharged through the nozzles. A rotary distributor of the latter kind is shown and described for illustrative purposes.

The sewage received in the distributor of a biological trickling filter is ordinarily a product of preliminary clarification or a similar process, yet it still contains some coarse floating matter that may clog a nozzle and also there is restriction of openings from the building up of films and accumulations of sludge and the like on solid surfaces contacted by the sewage, both due to purely mechanical adhesion and due to more complicated physical and biological processes.

Any stoppage is very undesirable because it makes the cross-sectional area of the nozzles variable, whereas that area should be constant so that an optimum rate of continuous dosage can be calculated and maintained. It also causes uneven dosage over the area of the bed which is objectionable for several reasons and if the stoppage or restriction becomes severe it may not be possible to deliver the full flow of sewage.

In order to check at least such extreme conditions, operators of sewage plants heretofore were required to clean distributor nozzles from time to time, and for this purpose it was customary that the operator scrape out every distributor nozzle separately with some hand operated tool. This is exceedingly unpleasant work which in most plants is only done when it becomes imperative, and as a result most plants operate with uneven distribution much of the time. It is to be kept in mind that uneven distribution of sewage over the bed and the consequent uneven distribution of working load leads to uneven and poorer biological operation and poorer effluent.

It is a primary object of this invention to provide a biological filter and a filter distributor which are free from such shortcomings, in order to improve both the operation of the filter and the maintenance of the filter distributor. Another object is to provide a liquid nozzle which can be readily and efficiently cleaned by mechanical means. Another object is to provide simple mechanical means whereby the distributor nozzle of a sewage plant may be readily and frequently cleaned either manually or automatically.

In the drawing, Fig. 1 shows one embodiment of the invention, partly in section. Fig. 2 is an enlarged detail from Fig. 1. Fig. 3 is a cross section through the detail shown in Fig. 2, taken along lines 3—3. Fig. 4 is a cross section through the detail shown in Fig. 2, taken along lines 4—4.

Numeral 10 stands for a trickling filter having filter bottom 11, underdrain 12 and filter bed 13, bounded by wall 14. Sewage to be filtered is received through feed pipe 15 which joins the stationary distributor base 16. The latter extends above filter bed 13, where it forms a support of and inlet to the rotating member 17 having a suitable number of distributor arms 18. The arms may be braced or supported as by wire ropes 19. Underdrain 12 has openings 20 for air and outlets 21 for filtered sewage and waste carbon dioxide.

Distributor nozzles 22, shown at the right hand arm 18 in Fig. 1, and more clearly shown in Figs. 2 and 3, are suitably spaced along each arm 18 in full accordance with well known principles as to appropriate dosage and distribution. As referred to above, rotation of arms 18 results from the reaction of the discharge of sewage through said nozzles. The rotation is counterclockwise in a plan view of the apparatus of Fig. 1; that is, from left to right in the view of Fig. 3 and from right to left in Fig. 4.

Each nozzle 22 may be integral with or suitably associated with a member 23 secured to arm 18 as by means of threaded portion 24. Member 23 may carry a hinged spray plate 25 of well known construction. Furthermore, eyes or similar means 26 are provided, preferably integral with or suitably associated with members 23; and a rod 27 is rotatably secured to arm 18 by means of eyes 26. This rod may be slotted as at 28 (Fig. 3). It runs substantially parallel to arm 18, from the innermost nozzle 22 to a point preferably a short distance beyond the end of arm 18, where a pin 29 that may be weighted as at 30, is rigidly fixed to the rod. Wiper means 31 are associated with rod 27, so as to respond to rotation of this rod, as for instance by means of a key fitting the slot 28. Each wiper may have a suitably shaped front or end portion 31a so positioned when retracted from nozzle 22 that the edge 25a of spray plate 25 will not interfere with its movement. Also each wiper 31 may be centered with respect to its nozzle 22, as by means of members 26, the connection of rod 27 and wiper 31 being a loose one along rod 27, but a rigid one or at least adapted to provide forced action, in the plane of rotation of rod 27. An arrangement of this type is preferred because it keeps the several wipers 31 in centered position regardless of differential extension or contraction of arm 18 and rod 27, and other factors of disturbance.

In operation, nozzles 22 are most simply and efficiently cleaned by turning rod 27 by moving pin 29 so that wipers 31 enter the nozzles 22. Thereafter, rod 27 is turned to withdraw cleaner 31 to such position as allows unrestricted flow or spray out of nozzles 22. Inasmuch as any distributor arm in filters of medium and large size may carry a substantial number of nozzles—more than one hundred are frequently provided on a single arm—it will be appreciated that a combination as described provides a considerable saving in working time and effort that is otherwise spent on manually cleaning the nozzles. More important, however, is the fact that as nozzles are so readily and quickly cleaned and this without unpleasant work, they will be kept in condition for uniform flow and distribution all of the time, with consequent better purification results.

Pin 29 and co-operating parts may be actuated manually or by automatic means, for instance as shown in Figs. 2 and 4. A trip arm 32 is suitably provided, for instance on top of filter wall 14 and in operative position relating to pin 29. Trip arm 32 may be either fixed or may be removably arranged by means of guide 33 and motor 34 or the like. Whenever arm 18 passes over trip 32, the latter being in operative position, pin 29 will be tilted as shown in Fig. 4 (center position, indicated in dotted lines). The power required for such tilting or shifting is very slight in comparison with the normal momentum of the reaction drive, so that the latter may serve to actuate the mechanism as shown. In Fig. 2, trip 32 is shown in withdrawn position so that pin 29 will pass it. It may be moved forward to trip the pin 29 and operate the cleaning mechanisms when desired to do so. As referred to, this may be automatically done and at predetermined periods by motor 34, or it may be manually set in and out. Also as referred to, trip 32 and associated parts may be omitted and pin or arm 29 moved manually. A weight 30 is shown on the end of arm 29 to return and hold wipers 31 in withdrawn position after each cleaning operation. Instead of pin 32 mounted on wall 14 and co-acting with arm 29 etc., as described, a motor reducer can be mounted at the end of arm 18 to operate rod 27. This motor can be started by a switch actuated from a trip at the filter wall, and can be self-reversing or self-stopping, the rest of the equipment being otherwise suitably modified to co-operate with such a motor.

The structure and operation illustrated and described are obviously susceptible of various changes without departing from the scope of the invention. As illustrated, the rod 27 and associated parts are shown outside the distributor arm 18 and for several reasons, including accessibility both for installation and inspection this is preferable, but they can be within the pipe 18 as well. All such changes are intended to be covered by the appended claims.

It will also be appreciated that nozzles and/or auxiliary means as herein disclosed can be made for and attached to existing distributors, forming a new article of manufacture, for use in combination with sewage distributors. They may be made so that rod 27 is adapted to be supported by and hinged in eyes 26, or in any other suitable manner.

I claim:

1. As an article of manufacture for use in combination with a sewage distributor, a member having a portion adapted to be engaged by a flanged and threaded member and thereby adapted to be secured to such distributor, a flanged and threaded nozzle member associated with said first-named member, and nozzle cleaning means associated with the first named member and comprising wiper means of shape adapted to register with said nozzle member, and means adapted to engage said wiper means.

2. As an article of manufacture for use in combination with a sewage distributor, a threaded nipple having a nozzle formed therein, a hinge member secured to said nipple and positioned adjacent said nozzle, and a wiper adapted to register with said nozzle and to be hinged on said hinge member.

3. In sewage treatment apparatus a sewage distributor, at least one tubular arm in said distributor, discharge openings spaced along said arm, a nozzle member permanently fitted into each of said openings, a nozzle in each of said nozzle members, a hinge member rigidly secured to each of said nozzle members, a wiper member pivotally secured to each of said hinge members in centered position with respect to the respective nozzle, each of said wiper members comprising parts adapted to be inserted in and to be withdrawn from the respective nozzle, and an actuator rod substantially as long as said arm, rotatable and laterally slidable with respect to said arm and adapted to control all of said wiper means of said arm with respect to their being inserted in or withdrawn from the respective nozzles.

4. Apparatus as claimed in claim 3 wherein each of said hinge members is adapted to loosely and rotatably secure the rod to the arm.

5. Apparatus as claimed in claim 3 comprising means at the end of said rod to rotate said rod.

6. In combination with a sewage treatment distributor arm provided with a plurality of discharge nozzles spaced therealong, means for periodically cleaning said nozzles comprising cleaning arms adapted to penetrate the nozzles, said arms being slidably mounted on a rod held in spaced relationship to said distributor arm and substantially parallel thereto, means for rotating said nozzle cleaning arms with rotation of said rod, means preventing lateral movement of said nozzle cleaning arms with respect to the said nozzle comprising protuberances in spaced relationship to said nozzle and to each other and adapted to center said cleaning arm with respect to the said nozzle, and means for the periodic partial rotation of said rod.

7. In combination with a sewage treatment distributor arm provided with a plurality of discharge openings spaced along said arm, a nozzle in each said opening, a nozzle member rigidly secured to each said nozzle and provided with a pair of raised eyes in spaced relationship to said nozzle and to each other, the axis of said eyes being substantially parallel to the axis of the distributor arm, a rod slidably and rotatably mounted in said eyes extending substantially the length of the distributor arm, nozzle cleaning arms adapted for insertion into said nozzle longitudinally slidably mounted on said rod, one between the eyes on each nozzle member, which nozzle cleaning arms are adapted to rotate with the rotation of the said rod, and means for the periodic partial rotation of said rod.

ALBERT B. HODGES.